Patented Jan. 30, 1945

2,368,452

UNITED STATES PATENT OFFICE 2,368,452

SEPARATION AND PURIFICATION OF GREEN OR WATER-SOLUBLE SULPHONIC ACIDS

Oliver H. P. Dawson, Baytown, Tex., assignor to Standard Oil Development Company, a corporation of Delaware No Drawing. Application November 25, 1943, Serial No. 511,738

10 Claims. (Cl. 260—504)

The present invention is directed to the production of purified sulphonic acids and salts thereof from petroleum.

The treatment of petroleum oils with sulphuric acid serves to remove asphaltic materials and, to a greater or lesser degree, aromatics, unsaturates and other undesirable components. This treatment results in the formation of an acid sludge which, in the past, has been chiefly of interest in that its disposal offered a considerable refinery problem.

This acid sludge contains sulphonation products which can be recovered by extraction. The alkali salts of these sulphonic acids are water-soluble and possess wetting or detergent properties. It is generally known that the first acid application removes asphaltic materials and polymerizes olefins, and that successive dumps of acid cause sulphonation to predominate. In white oil production and other refinery processes, therefore, where successive acid dumps are applied, sulphonation increases with each acid application. The separation and purification of these sulphonation products, however, is considered to be quite difficult.

The separation and purification of sulphonic acids (especially those produced in white oil production) can be easily accomplished by taking advantage of their solubility in aromatic compounds and their insolubility in paraffin compounds.

According to my invention all of the acid sludge possible is dissolved in an aromatic solvent such as toluene. (The sulphuric acid settles out undiluted with water and relatively low in carbon content.) A paraffin hydrocarbon, such as hexane, is poured into the toluene-sludge mixture in an amount necessary to precipitate most of the objectionable coloring matter, but not the sulphonic acids. The sulphonic acids remaining in solution in the toluene-hexane mixture are washed out with water, neutralized and dried.

To illustrate the application of my invention the following example is given. 3 liters of 75 phenol extract [1] was treated at 90° F. with ten successive treats with 40 pounds of 98% sulphuric acid per barrel of oil. The sludge obtained from each successive 40-pound acid application was mixed with 1.4 times its volume of toluene, a portion of the sludge going into solution with the toluene. Sulphuric acid of about 1.7 specific gravity, which was insoluble, was separated from the toluene solution. The toluene-sludge solution was mixed with a volume of hexane equal to twice that of the toluene previously used, whereupon considerable coloring matter and other impurities were precipitated. The sulphonic acids remaining in solution in the toluene-hexane mixture were extracted with water, neutralized with caustic, and dried.

The following tabulated data further illustrate the extraction and purification operation:

To determine the effect of the acid treating temperature on the yield of water-soluble sulphonic acids, a 3-liter treat similar to the one de-

|  | Sludge from Treat No. | | | | | | | | | |
|---|---|---|---|---|---|---|---|---|---|---|
|  | 1 | 2 | 3 | 4 | 5 | 6 | 7 | 8 | 9 | 10 |
| Sludge_____cc.. | 345 | 315 | 281 | 282 | 247 | 245 | 200 | 260 | 243 | 220 |
| Toluene added_____cc.. | 493 | 457 | 422 | 415 | 376 | 367 | 390 | 370 | 355 | 326 |
| Sulphuric acid separated_____cc.. | 75 | 115 | 142 | 142 | 148 | 141 | 127 | 149 | 125 | 123 |
| Specific gravity at 90° F_____ | 1.68 | 1.74 | 1.74 | 1.73 | 1.73 | 1.72 | 1.71 | 1.73 | 1.73 | 1.73 |
| Sludge soluble in toluene_____ | 16.0 | 41.5 | 65.0 | 78.0 | 74.0 | 60.0 | 34.0 | 99.0 | 110.0 | 87.0 |
| Hexane added_____gms.. | 630 | 630 | 800 | 800 | 752 | 734 | 780 | 740 | 710 | 652 |
| Impurities precipitated on adding hexane, gms.. | 4.0 | 16.0 | 27.0 | 26.0 | 25.0 | 18.0 | 10.0 | 35.0 | 46.0 | 30.0 |
| Purified sulphonic soap,[1]_____gms.. | 12.0 | 25.5 | 38.0 | 52.0 | 49.0 | 42.0 | 24.0 | 64.0 | 64.0 | 57.0 |

Purified sulphonic soap, total gms., 427.5.
[1] Purified sulphonic soap, percent by weight on oil charge, 14.5.
Pounds dry soap per 1,000 bbls. oil charge, 50,000.
[1] When ground to a powder and passed through a 40-mesh screen the powder had a cream color, and was entirely water-soluble.

scribed above was made at a temperature of 125° F. The aromatic solvent used in this case was a plant xylol cut having an I. B. P. of 274° F. and a F. B. P. of 320° F. The paraffin precipitant used was a paraffinic raffinate obtained by $SO_2$ ex-

---

[1] Phenol extract of a naphthenic base lube oil having a Saybolt viscosity at 100° F. of about 75 seconds.

traction of hydroformed naphtha having an I. B. P. of 218° F. and a F. B. P. of 410° F. (95% at 272° F.). The data obtained are as follows:

are cream color, whereas those produced by the prior methods mentioned above have the color of ordinary building sand. The sulphonates pro-

|  | Sludge from Treat No. | | | | | | | | | |
|---|---|---|---|---|---|---|---|---|---|---|
|  | 1 | 2 | 3 | 4 | 5 | 6 | 7 | 8 | 9 | 10 |
| Sludge_____cc__ | 350 | 355 | 350 | 257 | 270 | 255 | 268 | 250 | 165 | 216 |
| Aromatic added_____cc__ | 450 | 499 | 491 | 374 | 380 | 362 | 379 | 340 | 258 | 302 |
| Sulphuric acid separated_____cc__ | 100 | 105 | 100 | 134 | 100 | 105 | 121 | 108 | 112 | 108 |
| Specific gravity at 90° F_____ | 1.70 | 1.72 | 1.72 | 1.73 | 1.73 | 1.71 | 1.72 | 1.71 | 1.74 | 1.74 |
| Raffinate added_____cc__ | 900 | 710 | 950 | 748 | 760 | 724 | 758 | 680 | 516 | 604 |
| Purified soap_____gms__ | 20 | 38 | 27 | 49 | 62 | 70 | 74 | 89 | 41 | 75 |

Purified soap, total gms., 545.
Purified soap, percent by weight on oil charge, 18.4.
Pounds dry soap per 1,000 bbls. oil charge, 63,800.

The plant application of my invention involves the following operations:

The sludge obtained, as in the treating operation described above, is intimately mixed, without heating, with from one to 1½ volumes of an aromatic solvent (toluene, xylene or any naphtha of 75% or greater aromatic content), and settled for several hours. The sulphuric acid of about 1.7 specific gravity is then drawn off from the bottom. The insoluble sludge portion is next transferred to another kettle to be processed for fuel.

In order to precipitate coloring matter and other impurities from the aromatic soluble sludge portion left, a paraffinic naphtha (hexane or a low-boiling raffinate) is added in an amount ranging from equal to twice that of the aromatic previously added. The impurities precipitated from solution are dark colored sulphonic acids which may be used for purposes where purity is not required.

The aromatic-paraffinic-sludge solution is pumped to a clean agitator where the sulphonic acids are extracted with water, neutralized with sodium hydroxides, and dried. The dried soap may be ground to a powder if required or handled in lumps.

The aromatic-paraffinic mix is then fractionated for further use. To facilitate separation of the two naphthas, the final boiling point of one should be slightly lower than the initial boiling point of the other.

Yields of soap vary and depend upon the stock treated and upon the acid treating temperature. Yields obtainable when treating 75 phenol extract with ten 40-pound dumps of 98% sulphuric acid are as follows:

Treating temperature_____ ° F__ 90–100    125
Pounds soap per 1000 bbls. extract_____ 50,000    63,800

Other methods for recovering sulphonic acids from these acid sludges have hitherto been proposed. Among these are extraction of the sludge with amyl alcohol followed by washing of the extract with water and recovery of the sulphonic acids in neutralized form from the water solution, and extraction of the acid sludge with aromatic naphtha followed by washing of the extract with water and recovery of the sulphonic acids in neutralized form from the water extracts. Both of these methods produce sulphonates which are many shades darker than those obtained by the method of the present invention. An interesting fact is that the sulphonic acids produced by these methods have substantially the same color as the impure constituents precipitated by the paraffinic solvent in the method of the present invention. The purified sulphonates of the present invention duced by the method of the present invention are acceptable to the high grade soap trade, while those produced by the prior methods referred to above are not.

While several examples of aromatic solvents useful for the initial extraction step have been mentioned, it is to be understood that no attempt has been made to give an exhaustive list. In general, any solvent which is predominantly aromatic in character can be used. In like manner, the paraffinic solvent need not be selected from the specific examples given. Many paraffinic solvents, such as petroleum ether, octane and others, readily suggest themselves. It is required only that this solvent be predominantly paraffinic. It is preferred, as previously indicated, that the two types of solvents be of distinctly different boiling points to facilitate separation thereof for re-use. It may be mentioned that the color of the product appears to improve as the ratio of paraffinic to aromatic solvent increases. It is a fact, however, that some color improvement is achieved even when the paraffinic solvent is used in lesser amounts than the aromatic solvent.

In the practice of the present invention it is important that the sequence of steps described above be observed, since very little, if any, of the sludge sulphonic acids dissolve in paraffinic solvents, or to an appreciable extent in mixtures of paraffinic and aromatic solvents in which the paraffinic solvent predominates. In one operation an acid sludge containing sulphonic acid bodies was contacted with a paraffinic naphtha fraction. The paraffinic naphtha fraction remained substantially colorless and on application of water thereto it was found that little, if any, of the sulphonic acids had been extracted from the sludge. The paraffinic naphtha fraction seems to act as an anti-solvent on the aromatic extract selectively rejecting color bodies from the extract solution. The reason for this selective rejection of the color bodies is not understood, but it is believed that there are dark colored impurities present in the acid sludge which are less soluble in the aromatic solvent than in the dilute acid. These dark colored impurities are taken up in part from the dilute acid by the aromatic solvent but are precipitated on addition of the anti-solvent or paraffinic naphtha in which the dark colored material and sulphonic acids are substantially insoluble. Thus, unless the sequence of steps of the present invention is followed, little, if any, segregation of the sulphonic acids, to say nothing of purification, occurs.

In the appended claims sulphonic acids and soaps thereof are embraced in the term "sulphonic acid bodies."

The nature and objects of the present invention having been fully described, what I wish to claim as new and useful and to secure by Letters Patent is:

1. In a method for producing sulphonic acid bodies from the acid sludge obtained in the treatment of petroleum oils with concentrated sulphuric acid, the steps which comprise extracting the acid sludge with a predominantly aromatic hydrocarbon solvent, isolating the extract, mixing the extract with a predominantly paraffinic hydrocarbon solvent to precipitate colored impurities, separating the precipitated impurities from the solvent mixture and recovering a sulphonic acid body from the latter.

2. In a method for producing sulphonic acid bodies from the acid sludge obtained in the treatment of petroleum oils with concentrated sulphuric acid for the production of white oil, the steps which comprise extracting the acid sludge with a predominantly aromatic hydrocarbon solvent, isolating the extract, mixing the extract with a predominantly paraffinic hydrocarbon solvent to precipitate colored impurities, separating the colored impurities from the solvent mixtures and recovering a sulphonic acid body from the latter.

3. A method according to claim 1 in which the predominantly paraffinic solvent is used in an amount at least equal to that of the predominantly aromatic solvent.

4. A method for producing sulphonic acid bodies from petroleum oil which comprises treating petroleum oil with concentrated sulphuric acid at a temperature in excess of 1000° F. to produce an acid sludge, extracting the acid sludge with a predominantly aromatic hydrocarbon solvent, isolating the extract, mixing the extract with a predominantly paraffinic hydrocarbon solvent to precipitate colored impurities, separating the colored impurities from the solvent mixture and recovering a sulphonic acid body from the latter.

5. A method according to claim 4 in which the petroleum oil is one adapted to yield white oil upon treatment with concentrated sulphuric acid.

6. A method according to claim 4 in which the predominantly paraffinic solvent is employed in an amount at least equal to that of the predominantly aromatic solvent.

7. A method according to claim 4 in which the aromatic solvent is toluene and the paraffinic solvent is hexane.

8. A method according to claim 1 in which the aromatic solvent is toluene and the paraffinic solvent is hexane.

9. A method according to claim 1 in which the predominantly aromatic solvent and the predominantly paraffinic solvent have sufficiently different boiling points to permit easy separation of the two by distillation.

10. A method according to claim 4 in which the predominantly aromatic solvent and the predominantly paraffinic solvent have sufficiently different boiling points to permit easy separation of the two by distillation.

OLIVER H. P. DAWSON.

---

CERTIFICATE OF CORRECTION.

Patent No. 2,368,452. January 30, 1945.

OLIVER H. P. DAWSON.

It is hereby certified that error appears in the printed specification of the above numbered patent requiring correction as follows: Page 3, first column, line 34, claim 4, for "1000° F." read --100° F.--; and that the said Letters Patent should be read with this correction therein that the same may conform to the record of the case in the Patent Office.

Signed and sealed this 15th day of May, A. D. 1945.

Leslie Frazer (Seal)

Acting Commissioner of Patents.

tion having been fully described, what I wish to claim as new and useful and to secure by Letters Patent is:

1. In a method for producing sulphonic acid bodies from the acid sludge obtained in the treatment of petroleum oils with concentrated sulphuric acid, the steps which comprise extracting the acid sludge with a predominantly aromatic hydrocarbon solvent, isolating the extract, mixing the extract with a predominantly paraffinic hydrocarbon solvent to precipitate colored impurities, separating the precipitated impurities from the solvent mixture and recovering a sulphonic acid body from the latter.

2. In a method for producing sulphonic acid bodies from the acid sludge obtained in the treatment of petroleum oils with concentrated sulphuric acid for the production of white oil, the steps which comprise extracting the acid sludge with a predominantly aromatic hydrocarbon solvent, isolating the extract, mixing the extract with a predominantly paraffinic hydrocarbon solvent to precipitate colored impurities, separating the colored impurities from the solvent mixtures and recovering a sulphonic acid body from the latter.

3. A method according to claim 1 in which the predominantly paraffinic solvent is used in an amount at least equal to that of the predominantly aromatic solvent.

4. A method for producing sulphonic acid bodies from petroleum oil which comprises treating petroleum oil with concentrated sulphuric acid at a temperature in excess of 1000° F. to produce an acid sludge, extracting the acid sludge with a predominantly aromatic hydrocarbon solvent, isolating the extract, mixing the extract with a predominantly paraffinic hydrocarbon solvent to precipitate colored impurities, separating the colored impurities from the solvent mixture and recovering a sulphonic acid body from the latter.

5. A method according to claim 4 in which the petroleum oil is one adapted to yield white oil upon treatment with concentrated sulphuric acid.

6. A method according to claim 4 in which the predominantly paraffinic solvent is employed in an amount at least equal to that of the predominantly aromatic solvent.

7. A method according to claim 4 in which the aromatic solvent is toluene and the paraffinic solvent is hexane.

8. A method according to claim 1 in which the aromatic solvent is toluene and the paraffinic solvent is hexane.

9. A method according to claim 1 in which the predominantly aromatic solvent and the predominantly paraffinic solvent have sufficiently different boiling points to permit easy separation of the two by distillation.

10. A method according to claim 4 in which the predominantly aromatic solvent and the predominantly paraffinic solvent have sufficiently different boiling points to permit easy separation of the two by distillation.

OLIVER H. P. DAWSON.

CERTIFICATE OF CORRECTION.

Patent No. 2,368,452.                                    January 30, 1945.

OLIVER H. P. DAWSON.

It is hereby certified that error appears in the printed specification of the above numbered patent requiring correction as follows: Page 3, first column, line 34, claim 4, for "1000° F." read --100° F.--; and that the said Letters Patent should be read with this correction therein that the same may conform to the record of the case in the Patent Office.

Signed and sealed this 15th day of May, A. D. 1945.

(Seal)

Leslie Frazer

Acting Commissioner of Patents.